Patented Nov. 15, 1938　　　　　　　　　　　　　　　　　　　　　　　　　　2,137,019

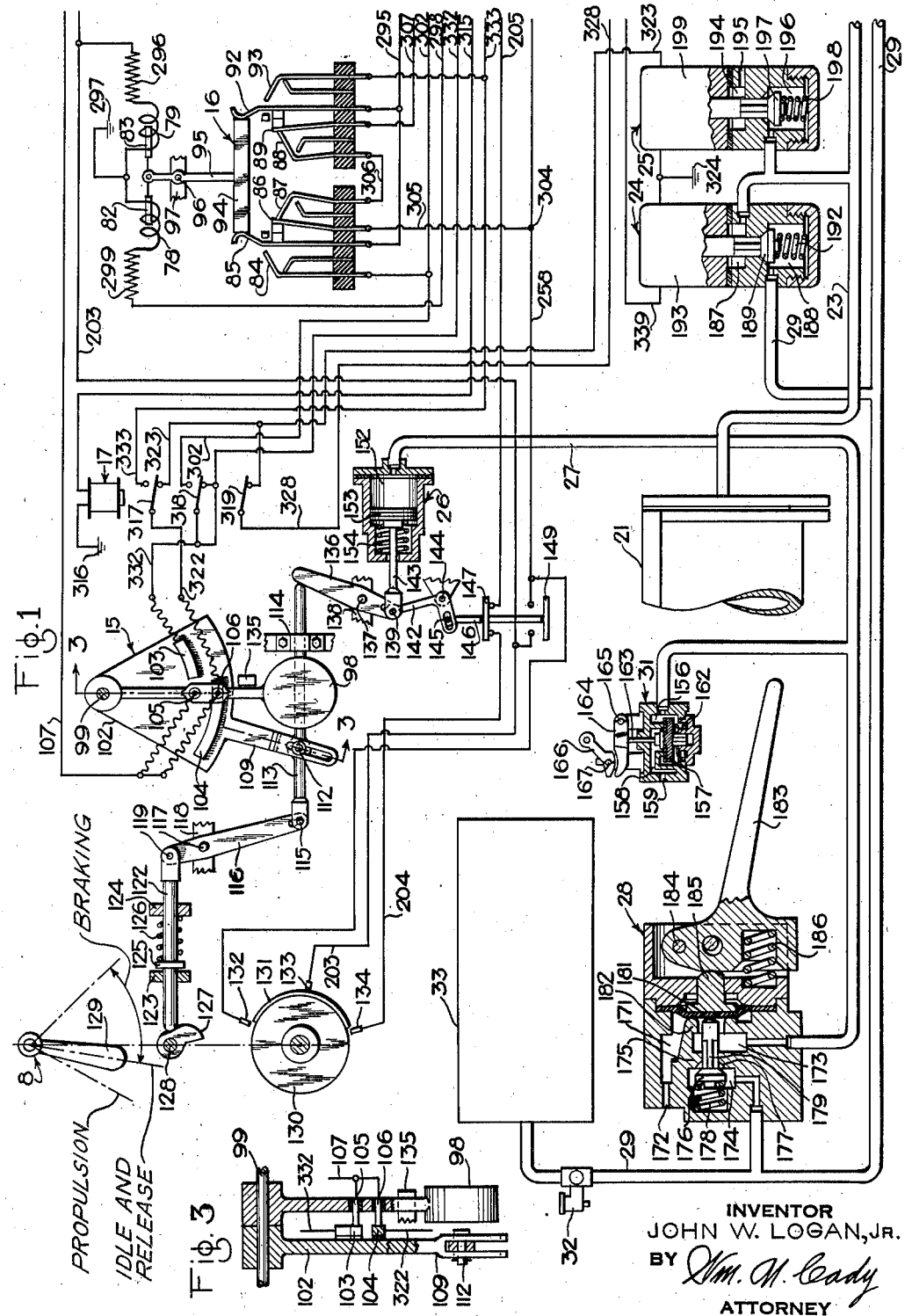

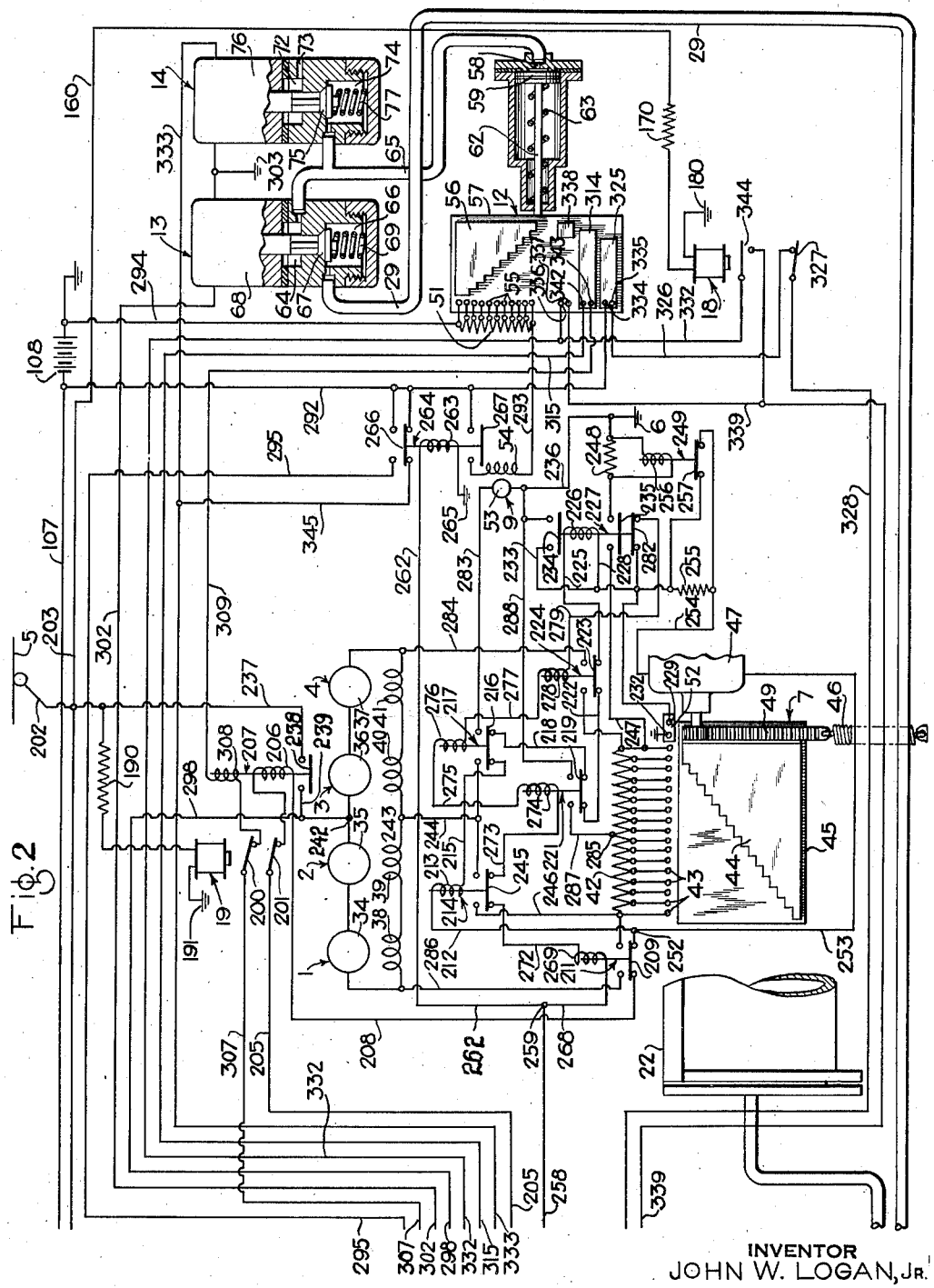

UNITED STATES PATENT OFFICE 2,137,019

RAILWAY VEHICLE BRAKE CONTROL MEANS

John W. Logan, Jr., Forest Hills, Pa., assignor to The Westinghouse Air Brake Company, Wilmerding, Pa., a corporation of Pennsylvania Application January 10, 1936, Serial No. 58,452

22 Claims. (Cl. 303—3)

My invention relates to railway vehicle brake control equipment and more particularly to such equipment used on electrically propelled vehicles employing both electric regenerative or dynamic braking and fluid pressure braking.

One object of my invention is to provide a brake equipment having an electrical regenerative or dynamic brake portion and a fluid pressure brake portion controlled by a retardation controller type of brake valve device which may be adjusted by the operator to effect a degree of application of the brakes corresponding to a desired degree of rate of retardation of the vehicle.

A further object of my invention is the provision of means to insure the initial application of the electric braking portion to a degree sufficient to effect a desired rate of retardation of the vehicle so long as the required braking is within the capacity of the electric braking portion and to effect the application of the fluid pressure brakes after the electric brakes have been fully applied, the braking effected by the fluid pressure brake being such that the total braking effect is sufficient to produce the rate of retardation of the vehicle called for by the setting of the retardation controller. A further object of my invention is the provision of means for effecting the application of the fluid pressure brakes automatically upon failure of the regenerative brakes or in place of the regenerative brakes if for any reason they become ineffective.

A further object of my invention is the provision of safety control means, such as "deadman" control or "conductor's valve" control means for effecting the application of the brakes without movement of the control handle of the brake valve device to a brake applying position, and to effect the initial application of the regenerative brake portion in the manner above indicated when the brakes are applied when safety control application of the brakes is effected as well as when the brakes are applied by means of the brake valve control device.

It is a further object of my invention to insure a maximum rate of retardation of the vehicle when the brakes are applied by the safety control means.

Further objects and advantages of my invention will appear from the following description of one preferred embodiment thereof taken together with the accompanying drawings.

In the accompanying drawings Figs. 1 and 2 taken together constitute a diagrammatic view of apparatus and circuits illustrative of one preferred embodiment of the invention, and Fig. 3 is a sectional view of the retardation controller device taken along the line 3—3 in Fig. 1.

As illustrated in Fig. 2 the vehicle may be driven by four driving motors 1, 2, 3 and 4 that are adapted to be connected to a source of power between an overhead trolley conductor 5 and ground at 6 and to be controlled by a controller 7 in accordance with the operation of the manually operable propulsion and braking control device 8. The motors 1, 2, 3 and 4 may be operated as generators during braking operation to effect regenerative braking for pumping current back into the power circuit, the braking operation being also under the control of the manually operated controller 8.

During regenerative braking, machines 1, 2, 3 and 4 operate as generators having their field windings energized from the exciting generator 9 and controlled by the exciter controller 12, that is in turn controlled by an application magnet valve device 13 and a release magnet valve device 14. A voltage equalizer device 16 is provided for preventing the generator from being connected to the power line until the generator voltage has become equal to the voltage of the power line. A transfer relay 17 is provided for selecting whether the retardation controller device 15 shall control directly the degree of application of the regenerative brakes or the degree of application of the fluid pressure brakes in a manner later to be described. A low voltage relay 18 and an overvoltage relay 19 are provided for automatically effecting the application of the fluid pressure brakes in the event of trolley failure.

The fluid pressure brake portion comprises the brake cylinders 21 and 22 and means for effecting the supply of fluid under pressure through the brake pipe 23 in accordance with the operation of an application magnet valve device 24 and a release magnet valve device 25 which are under the control of the low voltage relay 18, the exciter controller 12, and the retardation controller device 15. The retardation controller device 15 is provided with a pressure operated mechanism 26 that is subject to the pressure in control pipe 27 supplied therethrough through a foot valve device 28 from the main reservoir pipe 29 as supplied by the feed valve device 32 from the main reservoir 33.

The motors 1, 2, 3 and 4 comprise each armature windings 34, 35, 36 and 37, respectively, and field windings 38, 39, 40 and 41, respectively.

The motor controller 7 comprises a control rheostat resistor 42 having a plurality of contact members 43 connected to a like number of intermediate points on the resistor 42 and adapted to be engaged by a conducting segment 44 carried by the controller drum 45 which is normally held in its "all in" or illustrated position by a biasing means 46 and is adapted to be operated by a motor 47 against the force of the spring 46 to bring the conducting segment 44 successively into contact with the contact members 43, the motor 47 actuating the controller drum 45 through a pinion 48 and rack 49. A contact member 52 is also provided to be actuated by the controller drum 45, and through which the circuit of the dynamic braking contactors and the power contactors are completed when the controller is in its illustrated position only, in a manner and for a purpose to be later described.

When the generators 1, 2, 3 and 4 are used for dynamic braking purposes the field windings thereof are energized from the exciter 9 comprising an armature winding 53 and a field winding 54 the energization of which is controlled by the exciter controller device 12 which comprises a field rheostat resistor 51 having a plurality of contact members 55 connected to a corresponding number of intermediate points along the resistor 51. The resistor 51 is controlled by a conducting segment 56 which may be brought into contact with one or more of the contact members 55 in accordance with the movement of the controller drum 57 upon which the contact segment 56 is mounted. The controller drum 57 is operated by a pressure cylinder having a piston chamber 58 containing a piston 59 having a stem 62 that is connected to the controller drum 57, and about which the spring 63 is provided for biasing the piston 59 and the controller drum 57 to their illustrated positions.

The application magnet valve device 13 comprises a casing containing a chamber 64, that is in constant communication with the piston chamber 58 of the exciter controller device through pipe 65, and an application valve chamber 66, that is in constant open communication with the main reservoir pipe 29, and which contains an application valve 67 that is connected by a stem to be actuated by a magnet 68 in the upper part of the casing against the bias of a spring 69 in the valve chamber, that is adapted to force the valve to its seat when the magnet is unenergized.

The release magnet valve device 14 comprises a casing containing a chamber 72, that is in constant open communication with the atmosphere through an exhaust passage 73, and a release valve chamber 74 that is in constant communication with the piston chamber 58 through pipe 65 and that contains a release valve 75 that is operatively connected by a stem to a magnet 76 in the upper part of the casing, that is adapted to force the valve downwardly from its seat against the bias of a spring 77 in the valve chamber 74.

The voltage equalizing device 16 comprises a winding 78 that is energized in accordance with the voltage of the generators 1, 2, 3 and 4 upon the initiation of dynamic braking and a winding 79 that is energized in accordance with the voltage between the line conductor 5 and ground, for actuating opposing armatures 82 and 83 in accordance with the differential voltages of these two sources. The voltage equalizing device also comprises cooperating contact members 84 and 85 illustrated in circuit interrupting position, contact members 86 and 87 that are shown in engagement, cooperating contact members 88 and 89 that are shown in engagement, and cooperating contact member 92 and 93 that are illustrated in circuit interrupting position. These several contact members are actuated by an insulating operating member 94 that is carried by an arm 95 mounted on a pivot pin 96 in a suitable supporting member 97 in accordance with the differential forces acting upon the two armatures 82 and 83.

The retardation controller device 15 comprises a pendulum 98 that is mounted upon a shaft 99 upon which is also loosely mounted an insulating segment 102 carrying contact segments 103 and 104 adapted to control, respectively, the application and release of the brakes upon engagement with the cooperating contact members 105 and 106 carried by the pendulum 98 and connected by conductor 107 to the positive terminal of a battery 108. An arm 109 extends from the segment 102 and is provided with a slot into which a pivot 112 extends that is carried by the rod 113, one end of which is slidably mounted in a support 114 and the other end of which is connected by means of a pivot pin 115 to the lower end of a lever 116 mounted on the pivot pin 117 to a support 118 and connected by means of a pivot pin 119 at its upper end to a rod 122 that is slidably mounted in supporting members 123 and 124, and is provided with a collar 125 between which and the support 124 a spring member 126 is provided for normally forcing the rod 122 toward the left against a cam 127 that is carried by the shaft 128 of the controller device 8. A manually operable handle 129 is provided on the controller device 8 for operating the shaft 128, the cam 127 and a drum segment 130 carrying a conducting segment 131 for engaging either the contact members 132 and 133, or the contact members 133 and 134, to effect the application of the brakes or the supply of power to the motors 1, 2, 3 and 4 for propulsion purposes, respectively.

The retardation controller device 15 is so mounted that the pendulum 98 swings toward the left upon the retardation of the vehicle, and a stop 135 is provided for preventing the swinging of the pendulum beyond the vertical toward the right. Means are provided for setting the retardation controller upon an emergency application of the brakes resulting from a reduction in pressure in the safety control pipe 27 either by operation of a conductor's valve 31 or of the deadman control foot valve 28. Such means comprises a lever 136 the upper end of which engages the right-hand end of the rod 113, and is mounted on a pin 137 on a supporting member 138 the lower end of the lever 136 being connected, by means of a pivot pin 139 to a stem 143 and to the upper end of a bell crank lever 142 that is mounted on a pin 144, and the lower end of which provides a slot for engaging a pivot pin 145 in the operating member 146 of a switch comprising contact members 147 and 149. For operating the above described lever system a pressure cylinder is provided having a piston chamber 152 that is in open communication with the safety control pipe 27, and contains a piston 153 conected to the aforesaid stem 143 and provided with a spring 154 between the piston and the rear of the casing for normally forcing the piston toward the right upon the release of fluid under pressure from the piston chamber 152 and the control pipe 27.

The conductor's valve device 31 comprises a casing containing a chamber 156 that is in constant communication with the safety control pipe 27 and which contains a valve 157 for closing communication between the chamber 156 and a chamber 158 that is in constant communication with the atmosphere through an exhaust port 159. A spring 162 is provided in the chamber 156 for forcing the valve 157 to its seat to close communication between the chamber 156 and 158. A stem 163 extends upwardly from the valve 157 and engages a lever 164 that is pivotally mounted on the pivot pin 165 supported in a bracket extending upwardly from the casing structure and is adapted to be moved downwardly against the stem 163 by movement of an operating lever 166 in either direction. The operating lever 166 is mounted on a pivot pin 167 in a bracket extending upwardly from the valve casing structure.

The foot valve device 28 comprises a casing provided with an outlet chamber 171 that is in constant communication with the atmosphere through an exhaust port 172, a chamber 173 that is in constant communication with the safety control pipe 27, and a valve chamber 174 that is in constant communication with the main reservoir pipe 29, the chambers 173 and 174 being separated by a wall 175 in a casing structure. The valve chamber 174 contains a valve 176 that is adapted to engage the seat 177 in the wall 175 of the casing structure and is forced toward a seat by a spring 178 in the valve chamber 174. The valve 176 is provided with a stem 179 extending through a bore in said wall 175 and engaging a diaphragm 181 that is adapted to be urged against a rib seat 182 to close communication between the chamber 173 and the outlet chamber 171. A foot lever 183 is mounted on a pivot pin 184 and is adapted to urge the plunger 185 against the diaphragm 181 to force the diaphragm to its rib seat 182. A spring 186 is provided for urging the lever 183 upwardly when pressure thereon is released thus permitting the diaphragm 181 to be forced from its rib seat by the valve stem 179 in response to the force exerted by the spring 178 in a direction to force the valve 176 to its seat to close communication between the main reservoir pipe 29 and the safety control pipe 27 through the valve chamber 174 and the chamber 173.

The application magnet valve device 24 comprises a casing containing a chamber 187, that is in constant communication with the brake pipe 23, and a chamber 188, that is in constant communication with a main reservoir pipe 29 and which contains an application valve 189 that is biased to its seat by a spring 192 in the valve chamber 188 and is adapted to be forced from its seat upon the energization of a magnet 193 in the upper part of the casing.

The release magnet valve device 25 comprises a casing containing a chamber 194 that is in constant communication with the atmosphere through an exhaust port 195, and a chamber 196 that contains a release valve 197 that is biased to its seat by a spring 198 and is adapted to be forced from its seat against the bias of the spring 198 upon the energization of a magnet 199 provided in the upper part of the casing.

So long as the trolley 202 is in engagement with the overhead conductor 5 the low voltage relay 18 and the over-voltage relay 19 are energized. The circuit for energizing the relay 18 extends from conductor 5, through trolley 202, conductor 160, resistor 170, the winding of the relay 18 to ground at 180. The energization of the relay 18 through this circuit causes the contact members 344, 327 and 312 thereof to be held in their upper or illustrated positions.

The circuit for energizing the overvoltage relay 19 extends from the conductor 5, through trolley 202, conductor 237, resistor 190, the winding of the relay 19 to ground at 191. The normal line to ground voltage is not sufficient to raise the relay contact members 200 and 201 from their lower or illustrated positions.

When the operator wishes to operate the motors 1, 2, 3 and 4 as propulsion motors to drive the vehicle the handle 129 of the controller 8 is moved toward the left to the position indicated for propulsion, thus moving the drum 130 in a clockwise direction to cause the conducting segment 131 to bridge the contact members 133 and 134 to complete a circuit extending from the overhead trolley conductor 5 through trolley 202, conductor 203, contact member 133, segment 131, contact member 134, conductor 204, the switch element 147 of the retardation controller device, conductor 205, the contact member 201 of the relay 19, the lower winding 206 of the line switch 207, conductor 208, the contact member 209 of the dynamic braking relay 211 in its deenergized position, conductor 212, the winding 213 of the power relay 214, conductor 215, contact member 216 of the dynamic braking relay 217 in its deenergized position, conductor 218, contact member 219 of the dynamic braking relay 221 in its deenergized position, conductor 222, contact member 223 of the dynamic braking relay 224 in its deenergized position, conductor 225 and the winding 226 of the power relay 227, conductor 228, through the contact members 29 and 232 that are engaged by the conducting segment 52 of the controller 7, to ground, thus completing a circuit through the windings of the power relays 227 and 214 and through the winding of the line switch 207 causing the armature of each of these devices to move upwardly to their upper or circuit closing positions.

Upon upward movement of the armature of the power relay 227 the circuit through the winding 226, that was initially closed through the conducting segment 52 of the controller 7 is completed through conductor 233, the relay contact member 234 in its upper position, and conductor 236 to ground at 6, the contact member 235 is moved to its upper or circuit closing position, and the contact member 282 is moved upwardly from its circuit closing position. The result of the circuit changes effected by movement of the switch contact members 235 and 282 will be noted in a latter description of the circuits affected by these contact members. Energization of the winding 213 of the relay 214 causes the contact member 245 to be moved out of engagement with the lower fixed contact members to interrupt a circuit through the windings of the dynamic braking contactors 211, 221, 217 and 224 and to close communication between conductor 244 and 246 in the motor circuit.

The energization of the winding 206 of the line switch 207 causes the contact member 238 to be moved upwardly to complete a circuit from the overhead conductor 5 through the trolley 202, conductor 237, contact member 238 of the line switch 207 and conductor 239 to the junction point 202 where the circuit splits, one branch going through the armature windings 35 and 34 of the motors 2 and 1 and the field windings 38 and 39 of the motors 1 and 2 to the junction point 243, and the other branch extending from the junction point 242 through the armatures 36 and 37 of the motors 3 and 4 and the field windings 41 and 40 thereof to the junction point 243. From the junction point 243 the circuits extends through conductors 244, the contact member 245 of the power relay 214 in its upper or energized position, conductor 246 and the resistor 42 of the controller 7, conductor 247 and the contact member 235 of the power relay 227 in its upper or energized position, the resistor 248 of the current limiting relay 249 to the grounded terminal 6. The closing of this circuit supplies power to the motors 1, 2, 3 and 4 with all of the resistance 42 in series circuit therewith to drive the motors at a low rate of speed.

It will be noted that upon the completion of the circuit through the windings 206, 213 and 226 of the line switch 207 and of the power relays 214 and 227, respectively, a circuit in parallel with the windings of the power relay was also completed extending from the junction point 252, by conductor 253, propulsion motor 47 of the controller 7, conductor 254, resistor 255 or the contact member 257 of the relay 249 conductor 233, contact member 234 of the power relay 227, conductor 236, to ground at 6. The completion of this circuit energizes the controller motor 47, which, through the pinion 48 and gear 49, causes movement of the controller drum 45 in a direction to bring the conducting segment 44 progressively into engagement with the several contact members 43 that are connected to various points along the resistor 42, to progressively cut out portions of the resistor from the motor circuit, to thereby increase the power supplied to the driving motors 1, 2, 3 and 4. The initial operation of the motor 47 is controlled with the relay 249 in its lower or circuit closing position, the resistor 255 being in series circuit relation with the motor 47. The voltage developed across the resistor 248 energizes the winding 256 of the relay 249, and, upon a predetermined current flow, the armature and the contact member 257 are raised to interrupt the circuit in shunt to the resistor 255 thus inserting the resistor 255 in the controller motor circuit to slow down the operation of the motor and thus decrease the rate at which the resistance in the motor circuit is cut out.

If the operator wishes to interrupt the operation of the propulsion motors 1, 2, 3 and 4 the handle 123 of the controller 8 is moved from the propulsion position to its illustrated position thus separating the conducting segment 131 carried by the drum 130 from the contact member 134 and interrupting the above traced circuit extending through the winding 206 of the line switch 207, and the windings 213 and 226 of the power relays 214 and 227, respectively, thus causing the line switch 207 and the relays 214 and 227 to be deenergized and dropped to their illustrated positions interrupting the above traced circuit from the trolley 202 through the motors 1, 2, 3 and 4 to ground at 6.

The circuit extending from the junction point 252, through the motor 47 of the controller 7, to ground at 6, is likewise interrupted upon separation of contact member 134 from segment 129, thus deenergizing the motor 47 and permitting the spring 46 to move the controller drum 45 to its illustrated position to again insert all of the resistance 42 in the motor circuit. It will be noted that the circuit through the winding of the line switch 207, and the power relays 214 and 227, was completed to ground through the conducting segment 52 carried on the controller drum which bridges the contact members 229 and 232, when the controller drum is in its illustrated or "all in" position, thus insuring that the motor circuit will not again be completed until the drum 45 is returned to its illustrated position insuring that all of the resistance 42 is in circuit with the motor.

If the operator wishes to apply the brakes the handle 129 is moved from the illustrated or release position in a counterclockwise direction an amount depending upon the degree of application of the brakes desired, or more specifically, the rate of retardation of the vehicle desired, thus moving the drum 130 in a counterclockwise direction to cause the contact segment 131 to bridge the contact members 133 and 132, and likewise to cause the cam 127 carried by the shaft 128 to be moved in a counterclockwise direction and force the rod 122 toward the right, thus moving the lever 116 about the pivot pin 117 to move the pin 115 and the rod 113 toward the left, correspondingly moving the segment 102 of the retardation controller 15 an amount depending upon the rate of retardation of the vehicle desired. Upon movement of the segment 102 in a clockwise direction, the conducting segment 104 carried by the segment 102 is disengaged from the contact member 106 carried by the pendulum 98 and the conducting segment 103 carried by the insulating segment 102 is brought into engagement with the contact member 105. The amount of movement of the segment 102 by the brake valve handle 129 determines the amount of movement of the pendulum 98 toward the left that is required to cause the contact member 105 to disengage the conducting segment 103 and the contact member 106 to engage the conducting segment 104 to control the rate of retardation of the vehicle in a manner to be later explained. The movement of the contact segment 131 of the controller 8 to bridge the contact members 132 and 133 completes a circuit extending from the overhead line conductor 5, through trolley 202, conductor 203, contact member 133, segment 131 and contact member 132, conductor 258 to the junction point 259 where the circuit splits, one branch going by conductor 262 and the winding 263 of the relay 264 to the grounded terminal 265, and the other branch extending from the junction point 259 by conductor 268, the winding 269 of the dynamic braking relay 211, conductor 272 through contact member 245 of the power relay 214, conductor 273 and the winding 274 of the dynamic braking relay 221, conductor 275 and the winding 276 of the dynamic braking relay 217, conductor 277 and winding 278 of the dynamic braking relay 224, conductor 279, contact member 282 of the power relay 227, conductor 228, contact member 229, contact segment 52 of the controller drum 45 to the grounded terminal 232. The completion of the above traced circuit causes the armature of the relay 264 to be energized to move the switch contact members 266 and 267 upwardly to their circuit closing positions for purposes to be later explained, and energizes the four dynamic braking contactors 211, 221, 217 and 224 to be energized and moved to their upper circuit closing positions. These four dynamic braking relays or contactors close two circuits to effect dynamic braking by the motors 1, 2, 3 and 4, one circuit extending through the motor armatures, and the other circuit extending through the field windings, the motors now operating as generators to pump electric energy back into the power line.

The circuit for energizing the field windings of the machines 1, 2, 3 and 4 extend from the upper terminal of the armature 53 of the exciter 9, through conductor 283, the contact member 216 of the dynamic braking relay 217 in its upper circuit closing position, conductor 244 to the junction point 243 where the circuit divides, one branch going through the field windings 40 and 41 of the machines 3 and 4, conductor 284, and contact member 223 of the dynamic braking relay 224 in its upper circuit closing position, through the right hand half of the resistor 42, to the junction point 285, and the other branch extending from the junction point 243 through the field windings 39 and 38, respectively, of the machines 2 and 1, conductor 286 and the contact member 209 of the dynamic braking contactor 211 in its upper circuit closing position, through the left hand end of the resistor 42 to the junction point 285. From the junction point 285 the circuit continues through conductor 287, the contact member 219 of the dynamic braking relay 221, and conductor 288 to the lower terminal of the armature winding 53 of the exciter generator 9.

The armature circuit through the generators 1, 2, 3 and 4 for dynamic braking extends from the grounded terminal 6 through conductor 236, conductor 288, the contact member 219 of the dynamic braking relay 221, conductor 287 to the junction point 285 where the circuit devides, one branch going through the left hand portion of the resistor 42, the contact member 209 of the dynamic braking relay 211 in its upper circuit closing position, conductor 286 and armature windings 34 and 35 of generators 1 and 2, respectively, to the junction point 242, and the other branch extending from the junction point 285 through the right hand end of the resistor 42, the contact member 223 of the dynamic brake relay 224, conductor 284, armature windings 37 and 36 of the generators 4 and 3, respectively, to the junction point 242 where the circuit is completed through conductor 239, the contact member 238 of the line switch 207, conductor 237 and trolley 202 to the line conductor 5, upon the energization and closing of the line switch 207 in a manner to be presently described.

The energization of the relay 264 causes the contact member 267 to be moved upwardly to its circuit closing position, thus completing a circuit from the positive terminal of the battery 108 through conductor 292, contact member 267, the field winding 54 of the exciter generator 9, conductor 293, through the resistor 51 of the exciter controller 12, and conductor 294 to the negative terminal of the battery 108. The upper contact member 266 of the relay 264 interrupts a circuit extending from the positive terminal of the battery 108 through conductor 292, contact member 266, conductor 345, conductor 333, the winding of the magnet 76 to ground at 303, thus permitting the release valve 75 to seat, and connects the positive terminal of the battery 108 through conductor 292, contact member 266, conductor 295, to the contact members 85 and 92 of the voltage equalizing device 16.

The purpose of the voltage equalizing device 16 is to require the excitation of the field windings 38, 39, 40 and 41 of the generators 1, 2, 3 and 4 to be increased to a value sufficient that the voltage between the generator armatures and ground, that is between the junction point 242 and ground, is equal to the voltage between the overhead line conductor 5 and ground before the line switch 207 is closed to connect the generators to the overhead conductor. One winding 79 of the voltage equalizer device is subject to the voltage between the line conductor 5 and ground through a circuit extending from the line conductor 5 through trolley 202, conductors 203, resistor 296, and winding 79, to the grounded terminal 297, and the winding 78 is subject to the voltage between the junction point 242 in the motor armature circuit and ground by a circuit extending from the junction point 242 through conductor 298, resistor 299, and winding 78 to the grounded terminal 297.

Upon the initial closing of the dynamic braking relays 211, 221, 217 and 224 and of the relay 264, the voltage between the line conductor 5 and ground is greater than the voltage between the positive terminal 242 of the generators and ground, thus causing the winding 79 to be energized to a greater degree than the winding 78 and causing the armatures 82 and 83 thereof to be moved toward the right swinging the arm 95 about the pivot pin 96 in a clockwise direction and causing engagement of the contact members 85 and 84 and permitting the contact member 86 to move out of engagement with the contact member 87.

The engagement of the contact members 84 and 85 completes a circuit from the positive terminal of the battery 108 through conductor 292, the contact member 266 of the relay 264, conductor 295, the contact members 85 and 84 of the voltage equalizer device 16, conductor 302 and the winding of the magnet 68 of the application magnet valve device 13 to ground at 303, thus energizing the magnet of the application magnet valve device 13 and causing it to force the valve 67 downwardly against the bias of the spring 69 to permit the flow of fluid under pressure from the main reservoir pipe 29 through chambers 66 and 64 and pipe 65 to the piston chamber 58 of the exciter controller device 12. As fluid under pressure is supplied to the piston chamber 58 the piston 59 moves toward the left against the bias of the spring 63 moving the controller drum 57 carrying the conducting segment 56 into engagement with a successive number of the contact members 55 connected at intermediate points to the resistor 51 thus progressively cutting out resistance from the circuit of the field winding 54 of the exciter generator 9 to increase the voltage of the generator. As the voltage of the exciter generator 9 increases the voltage impressed on the field windings 38, 39, 40 and 41 of the generators 1, 2, 3 and 4 correspondingly increases, thus increasing the voltage produced by the generators until the voltage on the winding 78 of the voltage equalizer device is equal to that on the windings 79, when the armature 82 will exert a force equal to the armature 83 and cause the member 94 to be moved to its central or illustrated position, thus interrupting the above traced circuit through the winding of the magnet 68 upon separation of the contact members 84 and 85 and causing the contact member 86 to again engage the contact member 87.

The operation of the voltage of equalizer device 16 in the manner above described upon the initial movement of the controller segment 131 to a position to bridge contact members 132 and 133 to initiate the application of the brakes, effects the separation of the contact members 86 and 87 to prevent the closing of the line switch 207 until a voltage balance exists between the generated voltage of the generators 1, 2, 3 and 4 and the voltage from the line conductor 5 to ground. Upon engagement of the contact members 86 and 87 a circuit is completed extending through the contact members 132 and 133 of the controller drum 130 and the conducting segment 131 thereof, the conductor 258 to the junction point 304, through conductor 305, contact members 86 and 87, conductors 306, contact members 88 and 89 of the voltage equalizer device, conductor 307, contact member 200 of the relay 19, the winding 308 of the line switch 207, conductor 309, contact member 343, the conducting segment 314 and contact member 342 on the exciter controller 12, conductor 315, the winding of the changeover relay 17 to ground at 316, thus energizing the line switch 207 and causing the contact member 238 to be moved to a circuit closing position to complete the dynamic braking circuit from the generators 1, 2, 3 and 4 to the overhead line conductor 5, and energizing the changeover relay 17 to cause the contact members 317, 318 and 319 thereof to be moved to their upper positions.

Prior to the operation of the segment 102 of the retardation controller device 15 to a brake applying position and prior to operation of the transfer relay 17 as just described, a circuit extends from the positive terminal of the battery 108, through conductor 107, contact member 106, conducting segment 104 of the retardation controller device, conductor 322, contact member 317 of the transfer relay 17, conductor 323 to the winding of the magnet 199 of the release magnet valve device 25, to ground at 324, thus energizing the magnet 199 and forcing the release valve 197 downwardly against the bias of the spring 198 to effect communication between the brake cylinders 21 and 22 and the atmosphere through brake cylinder pipe 23, valve chamber 196, chamber 194, exhaust port 195 to maintain the pneumatic brake released. This circuit is interrupted by separation of the conducting segment 104 and the contact member 106 upon movement of the brake valve handle 129 to a brake applying position, but the winding of the magnet 199 is still maintained energized through a circuit extending from the positive terminal of the battery 108 through conductor 292, contact member 334, the contact segment 325 and contact member 335 of the exciter controller device 12, conductor 326, the contact member 327 of the low voltage relay 18, conductor 328, the lower contact member 319 of the transfer relay 17 and conductor 323 through the winding of the magnet 199 to ground at 324.

Upon energization of the winding of the transfer relay 17 as above described, the several contact members 317, 318, 319 are moved upwardly thus interrupting the circuits through the contact member 319 just described, and deenergizing the magnet of the release magnet valve device 25, permitting the release valve 197 to be forced to its seat by the spring 198.

Upon energization of the transfer relay 17 the dynamic brakes are under control of the retardation controller device 15, the application magnet valve device 13 being energized by a circuit extending from the positive terminal of the battery 108 through conductor 107, contact member 105 of the pendulum 98, the conducting segment 103, conductor 332, relay contact member 318 in its upper position, conductor 302, the winding of the magnet 68 of the application magnet valve device 13, to ground at 303, thus energizing the magnet valve device 13 and forcing the application valve 67 downwardly against the bias of the spring 69 permitting the further flow of fluid from the main reservoir pipe 29 to the piston chamber 58 to move the exciter controller drum 57 in a direction that the conducting segment 56 will bridge a larger number of the contact members 55, thus cutting out a greater portion of the resistor 51 from the circuit of the winding 54 of the exciter generator, to increase the exciter generator voltage and thereby the output or dynamic braking current of the main motors or generators 1, 2, 3 and 4. As the application of the regenerative brake increases, the rate of retardation of the vehicle will likewise increase, thus causing the pendulum 98 of the retardation controller device to move forward or towards the left, and upon a predetermined rate of retardation called for by the position of the brake valve handle 129 and of the retardation controller segment 102, the contact member 105 will be brought out of engagement with the conducting segment 103 thus interrupting the circuit above traced through the winding of the magnet 68 of the application magnet valve device 13, deenergizing the magnet and permitting the spring 69 to force the valve 67 to its seat to cut off further communication from the main reservoir pipe 29 to the piston chamber 58 thus maintaining the controller drum 57 in a fixed position. If the rate of retardation of the vehicle reaches a predetermined greater amount of movement of the pendulum 98 toward the left will be sufficient to cause the contact member 106 carried thereby to engage the conducting segment 104 and complete a circuit extending from the positive terminal of the battery 108 through conductor 107, the contact member 106, conducting segment 104, conductor 322, the transfer relay contact member 317 in its upper circuit closing position, conductor 333, the winding of the magnet 76 of the magnet valve device 14 to ground at 303, energizing the release magnet valve device 14 and causing the release valve 75 to be forced downwardly against the bias of the spring 77 to effect communication from the piston chamber 58 to the atmosphere through the release valve chamber 74 and the exhaust port 73, to permit movement of the piston 59 and of the controller drum 57 toward the right in response to the force exerted by the spring 63, thus disengaging the conducting segment 56 of the controller drum from a number of the contact members 55 to insert a greater portion of the resistor 51 in circuit with the field winding 54 of the exciter generator 9 to decrease the exciter voltage and thereby the output of dynamic braking current from the generators 1, 2, 3 and 4.

The output voltage of the generators 1, 2, 3 and 4 is dependent partly upon the energization of the field windings and partly upon the generator speed. Consequently, as the vehicle slows down and the speed of the generators 1, 2, 3 and 4 correspondingly decreases, the operation of the retardation controller device will cause the exciter controller 12 to move the drum 57 further toward the left until eventually all of the resistor 51 is cut out of the excitor generator field circuit and, in order to maintain the desired rate of retardation of the vehicle, it becomes necessary to apply the fluid pressure brakes. The contact segment 325, carried by the controller drum 57 of the exciter controller device 12 and which completes a circuit through the contact members 334 and 335 and the magnet 199 of the release magnet valve device 25 controlling the pneumatic brake, is of such length that the circuit is interrupted therethrough just prior to the complete travel of the controller drum 57, and upon further movement of the controller drum 57 the contact member 338 carried by the drum, engages contact members 336 and 337 and completes a circuit extending from the positive terminal of the battery 108 through conductor 107, the contact member 105 and conducting segment 103 of the retardation controller device 15, conductor 332, contact members 336 and 337, and conducting segment 338, conductor 339, the winding of the magnet 193 of the application magnet valve device 24 controlling the pneumatic brakes to ground at 324, thus forcing the valve 189 of the magnet valve device 24 from its seat to open communication from the main reservoir pipe 29 through application valve chamber 187 and brake cylinder pipe 23 to the brake cylinders 21 and 22 to effect pneumatic application of the brakes. The positions of the conducting segments 325 and 338 on the controller drum 57 of the exciter controller are so arranged as to effect the initial application of the pneumatic brakes just prior to the complete application of the dynamic brakes in order to avoid the uneven braking effect that might result from a loss in the desired rate of retardation of the vehicle if the dynamic brakes were completely released prior to initiation of fluid pressure brakes.

Immediately after the initial application of the fluid pressure brakes the movement of the drum 57 is sufficient that the conducting segment 314 moves out of engagement with the contact members 342 and 343 thus interrupting the circuit through the winding 308 of the line switch 207 and the winding of the transfer relay 17 and permitting the line switch and transfer relay contact members to drop to their lower or illustrated positions.

Upon the movement of the contact members 317, 318 and 319 to their lower or illustrated positions the above traced circuit through the contact member 317 and the winding of the magnet 199 of the release magnet valve device 25 is again established so that the control of the release magnet valve device is again determined by the cooperative relation between the contact member 106 carried by the pendulum 98 and the conducting segment 104. The above traced auxiliary circuit for also controlling the release magnet valve device 25 through the contact member 319 of the transfer relay 17 is interrupted by the exciter controller upon separation of the contact members 334 and 335 from the conducting segment 325, so that the release magnet valve device 25 is completely under the control of the retardation controller device 15. The application magnet valve device 24 is also completely under the control of the retardation controller device 15 through the above traced circuit extending through the retardation contact member 105, segment 103, conductor 332, the conducting segment 338 and contact members 336 and 337 on the drum 57, and conductor 339.

The control of the application and release magnet valve devices 24 and 25 by the retardation controller device 15 is now exactly similar to the control of the application and release magnet valve devices 13 and 14 respectively to control electrical application of the brakes when the relay 17 was in its energized position. So long as the contact member 105 of the pendulum 98 remains in engagement with the conducting segment 103 the application magnet valve device 24 remains energized and the valve 189 unseated to effect communication from the main reservoir pipe 29 to the brake cylinders 21 and 22, and upon separation of the contact member 105 from the conducting segment 103 this magnet valve device is deenergized and the valve 189 seated. Also, upon movement of the pendulum 98 to effect engagement of the contact member 106 with the conducting segment 104, the release magnet valve device 25 is energized to effect the release of fluid under pressure from the brake cylinders 21 and 22.

It should be noted that upon the transfer of the control of the retardation controller device from the control of the dynamic brakes to control of the fluid pressure brakes, as above described, the generated voltage on the winding 78 of the voltage equalizer device becomes less than the voltage on the winding 79 thereof, thus causing the armatures 82 and 83 to be moved toward the right and the member 94 to be moved toward the left to cause the contact member 85 to engage the contact member 84. The winding of the magnet 68 of the application magnet valve device 13 which was formerly energized through the contact member 318 of the transfer switch 17 when in its energized or upper position, while the magnet valve devices 13 and 14 were under the control of the retardation controller 15, is now maintained energized through a circuit extending from the positive terminal of the battery 108 through conductor 292, contact member 266 of the relay 264 in its upper circuit closing position, conductor 295, the contact members 85 and 84 of the voltage equalizer device 16, conductor 302, the winding of the magnet 68 of the application magnet valve device 13, to ground at 303, thus maintaining the application valve 67 from its seat to effect the continuous communication between the main reservoir pipe 29 and the piston chamber 58 of the exciter controller device 12 to maintain the exciter controller in its "full travel" position.

If the operator now wishes to release the brakes the handle 129 of the controller device 8 is moved to its release or illustrated position thus interrupting the circuit through the conducting segment 131, the conductor 258, and the winding of the four dynamic braking contactors 211, 221, 217 and 224, and the winding of the relay 264 to permit the contact members of these relays to drop to their lower or illustrated positions.

As the relay 264 drops to its lower or illustrated position the contact member 266 thereof closes a circuit from the positive terminal of the battery 108 through conductor 292, contact members 266, conductor 345 and conductor 333, the winding of the magnet 76, and to ground at 303, to energize the magnet 76 and force the release valve 75 downwardly against the bias of the spring 77 to effect the release of fluid under pressure from the pressure chamber 58 of the exciter controller device 12 to the atmosphere through the exhaust port 73.

As the contact member 266 of the relay 264 drops to its lower or illustrated position the circuit for energizing the application magnet valve device 13 extending from the positive terminal of the battery 108 through conductor 292, the contact member 266 in its upper position, conductor 295, contact members 85 and 84 of the voltage equalizer device 16 and conductor 302 is interrupted, thus deenergizing the winding of the magnet 68 of the application magnet valve device 13 and permitting the valve 67 to be forced to its seat by the spring 69 to close communication between the main reservoir pipe 29 and the piston chamber 58 of the exciter controller device 12.

Upon the release of fluid under pressure from the piston chamber 58 the spring 63 moves the piston 59 and the controller drum 57 toward the right as viewed in the figure, interrupting the above traced circuit for energizing the application magnet valve device 24 through the contact members 336, 337 and the conducting segment 338 carried by the controller drum 57, thus deenergizing the magnet 193 and permitting the application valve 189 to be forced to its seat by the spring 192 to close communication between the main reservoir pipe 29 and the brake cylinder pipe 23. At substantially the same time the right hand end of the segment 325 of the controller drum 57 engages the contact members 334 and 335 to close the above traced circuit through the winding of the release magnet valve device 25, thus energizing the magnet 199 and forcing the release valve 197 downwardly against the bias of the spring 198 to effect the release of fluid under pressure from the brake cylinders 21 and 22 through the brake cylinder pipe 23 and the exhaust port 195 to the atmosphere, to release the fluid pressure brake.

If, for any reason upon the application of the brakes as above described, the dynamic brakes are ineffective the operation of the exciter controller 12 will be continued from its illustrated position to the position calling for maximum electric application of the brakes, and effect the pneumatic application of the brakes in the manner above described, thus insuring automatic application of the pneumatic brakes in case of failure of the dynamic brake.

In case of trolley failure while the dynamic brakes are applied thus interrupting the dynamic braking circuit, the retardation controller would call for a greater braking force, thus causing the controller 12 to be operated to increase the generator voltage. At a predetermined overvoltage the relay 19 will operate to raise the contact members 200 and 201 to cause the line switch 207 to drop to its circuit interrupting position. When the line switch opens the low voltage relay 18 will become deenergized thus permitting the contact members 344 and 327 to drop to their lower positions. The contact member 344 completes a circuit between the conductors 332 and 339 corresponding to that formerly completed by the exciter controller through contact members 336, 337 and the conducting segment 338, thus effecting the energization of the application magnet valve device 24 controlling the pneumatic application of the brakes. The contact member 327, in dropping to its lower, or circuit interrupting position interrupts the above traced circuit through the winding of the release application magnet valve device 25 thus permitting the valve 197 to be seated by the spring 198, and bring the further control of this valve under the control of the retardation controller through the contact member 106 and the conducting segment 104 and the circuit extending through the transfer relay contact member 317, above traced.

Application of the brakes may be effected independently of the controller device 8, either through operation of the foot valve device 28 or of the conductor's valve 31. Should pressure be released from the lever 183 of the foot valve device 28, the spring 186 will force the lever upwardly about the pivot pin 184 thus permitting the valve spring 178 to force the valve 176 to its seat to close communication from the main reservoir pipe 29 to the safety control pipe 27 through valve chamber 174 and chamber 173, the stem 179 of the valve forcing the diaphragm 181 from its seat rib 182 and effecting communication from the safety control pipe 27 to the atmosphere through chambers 173, 171 and the exhaust port 172.

A reduction in safety control pipe pressure may also be effected by operation of the control lever 166 of the conductor's valve device 31 which is fulcrumed about the pivot pin 167 and forces the lever 164 downwardly against the stem 163 to force the valve 157 from its seat and open communication from the safety control pipe 27 to the atmosphere through the valve chamber 156, the chamber 158 and the exhaust port 159.

Upon a reduction in safety control pipe pressure, the pressure within the chamber 152 of the retardation controller device is correspondingly reduced, thus permitting the spring 154 to force the piston 153, the piston stem 143, and the pivot 139 toward the right and actuate the lever 136 about the pin 137 in a counterclockwise direction to force the rod 113 toward the left and move the segment 102 of the retardation controller device 15 in a counterclockwise direction an amount determined by the setting of the device. The amount of movement of the rod 113 may be arranged to be the same as that required to produce the maximum rate of retardation effected by movement of the lever 129 of the controller 8, or it may be adjusted to give a greater rate of retardation of the vehicle, depending upon the desired emergency rate of retardation. The stem 143 and pivot pin 139 also moves the bell crank lever 142 in a clockwise direction to raise the switch member 146 and the contact members 147 and 149. The contact member 147 thus interrupts the power control circuit through the conductor 204 and contact members 134, 133 of the controller device in case the contact segment 131 is in a position to effect a propulsion operation of the motors 1, 2, 3 and 4. The switch contact member 149 thus raised effects communication from the overhead trolley through the windings of the several dynamic braking relays, and conductors 203 and 258, in the same manner as it would be effected upon movement of the brake valve handle 129 to a brake applying position, thus effecting like operation of the dynamic brake controlling magnet valve devices 13 and 14 by the retardation controller 15, as above described respecting application of the brakes by the controller device 8. The brakes are thus applied upon a reduction in safety control pipe pressure in the manner above described, the dynamic brakes being applied to a degree determined by the retardation controller device so long as the dynamic brakes are sufficient to effect the desired rate of retardation of the vehicle. When the speed of the vehicle has decreased sufficiently that the dynamic brakes are no longer able to effect the desired rate of retardation of the vehicle, the transfer relay 17 operates in the manner above described to transfer the control of the retardation controller device 15 to the magnet valve devices 24 and 25 to control pneumatic application of the brakes.

Having now described my invention, what I claim as new and desire to secure by Letters Patent, is:

1. In a brake equipment for vehicles, in combination, electric regenerative braking means, fluid pressure braking means, a manually operable device for controlling the brakes to effect an application of the brakes dependent upon the amount of movement of the device from its release position, magnet valve means for controlling the application and release of the electric braking means, magnet valve means for controlling the application and release of the fluid pressure braking means, a retardation controller device, and means responsive to the movement of said manually operable means to a brake applying position for placing the magnet valve means for controlling the electric braking means under the control of said retardation controller device, and means responsive to substantially full application of said electric braking means for interrupting the control of said electric brake controlling magnet valve means by said retardation controller and establishing control of said fluid pressure brake controlling magnet valve means by said retardation controller.

2. In a braking equipment for vehicles, in combination, electric regenerative braking means, fluid pressure braking means, a manually operable device for controlling the brakes to effect an application of the brakes an amount dependent upon the amount of movement of said manually operable means from its release position, an application magnet valve device and a release magnet valve device for controlling the application and release of the electric braking means, an application magnet valve device and a release magnet valve device for controlling the application of the fluid pressure braking means, a retardation controller device, and means responsive to the movement of said manually operable means to a brake applying position for closing both of said release magnet valve devices and for effecting control of said electric brake controlling application and release magnet valve devices by said retardation controller, and means responsive to the failure of said electric braking means for automatically effecting the application of the fluid pressure braking means.

3. In a brake equipment for vehicles driven by electric motors, in combination, a source of electric power for said motor, means for connecting said motors to said source to effect regenerative braking, an exciter generator for controlling the excitation of said motors during dynamic braking, an application magnet valve device and a release magnet valve device for controlling the voltage of said exciter, a fluid pressure brake, an application magnet valve device and a release magnet valve device for controlling the application of said fluid pressure brake, a voltage balancing device, a line switch, for connecting said motors to said source of supply, a transfer relay, a manually operable means for controlling the brakes to effect an application of the brakes dependent upon the amount of movement of said device from its release position, means operative upon movement of said manually operated means to a brake applying position for effecting closure of said first named release magnet valve device and for effecting operation of said voltage balancing device to effect the energization of said first named application magnet valve device to progressively increase the voltage of said exciter generator, said voltage equalizing device being operative, upon voltage balance between the motors of said source of power supply, to effect the operation of said line switch to a circuit closing position and operation of said transfer relay to a position to effect control of said first named application magnet valve device and release magnet valve device by said retardation controller.

4. In a brake equipment for vehicles driven by electric motors, in combination, a source of electric power for said motors, means for connecting said motors to said source to effect regenerative braking, an exciter generator for controlling the excitation of said motors during dynamic braking, means including an application magnet valve device and a release magnet valve device for controlling the voltage of said exciter, a fluid pressure brake, an application magnet valve device and a release magnet valve device for controlling the application of said fluid pressure brake, a voltage balancing device, a line switch for connecting said motors to said source of supply, a transfer relay, a manually operable means for controlling the brakes to effect an application of the brakes dependent upon the amount of movement of said device from its release position, means operative upon movement of said manually operated means to a brake applying position for effecting closure of said first named release magnet valve device and for effecting operation of said voltage balancing device to effect energization of said first named application valve device to progressively decrease the voltage of said exciter generator, said voltage equalizing device being operative upon voltage balance between the motors and said source of power supply for effecting operation of said line switch to a circuit closing position and operation of said transfer relay to a position to effect the control of said first named application magnet valve device and release magnet valve device by said retardation controller, and means responsive to substantially full application of the dynamic brake for effecting operation of said transfer relay to interrupt the control of said first named application and release magnet valve device by said retardation controller, and to effect control of said second named application and release magnet valve devices by said retardation controller to control the degree of application of the fluid pressure brakes.

5. In a brake equipment for vehicles driven by electric motors, in combination, a source of power for driving said electric motors, a line switch for connecting said motors to said source of power to effect dynamic braking, an exciter generator and an exciter controller for controlling the excitation of said motors during dynamic braking, electrically operated means for controlling said exciter controller, a fluid pressure brake, electrically operated means for controlling the application and release of said fluid pressure brake, a voltage balancing device, a transfer relay, manually operable means for controlling the brakes to effect an application of the brakes to a degree depending upon the amount of movement of said means from its release position, a retardation controller, means operative upon movement of said manually operable means to a brake applying position to effect operation of said exciter controller to gradually increase the voltage thereof and of the motors, and means effective upon a balance in the voltage generated by the motors with the voltage of the power source for operating the line switch to connect the motors to said source and for operating said transfer relay to effect the further control of exciter generator in accordance with the movement of the retardation controller.

6. In a brake equipment for vehicles driven by electric motors, in combination, a source of power for driving said electric motors, a line switch for connecting said motors to said source of power to effect dynamic braking, an exciter generator and an exciter controller for controlling the excitation of said motors during dynamic braking, electrically operated means for controlling said exciter controller, a fluid pressure brake, electrically operated means for controlling the application and release of said fluid pressure brake, a voltage balancing device, a transfer relay, manually operable means for controlling the brakes to effect an application of the brakes depending upon the amount of movement of said means from its release position, a retardation controller, means operative upon movement of said manually operable means to a brake applying position to effect operation of said exciter controller to gradually increase the voltage thereof and of the motors, and means effective upon a balance in the voltage generated by the motors with the voltage of the power source for operating the line switch to connect the motors to said source and for operating said transfer relay to further control the exciter generator in accordance with the movement of the retardation controller, and means responsive to operation of said exciter controller to a position to effect substantially maximum excitation of said exciter generator for interrupting the excitation of said line switch and of said transfer relay to effect the interruption of said dynamic braking circuit and to effect control by said retardation controller device of said electrical means for controlling the application and release of the fluid pressure brakes.

7. In a brake equipment for vehicles, in combination, electric generator braking means, fluid pressure braking means, a retardation controller device for controlling the degree of application of the brakes, manually operable means for varying the setting of said retardation controller device for applying the brakes to effect a desired rate of retardation of the vehicle, controller means controlled by said retardation controller device for initially applying said electric braking means to effect the degree of braking required by the position of said manually operable means, and effective if the regenerative brakes are ineffective to automatically apply the fluid pressure brakes to effect the desired rate of retardation of the vehicle under the control of the retardation controller.

8. In a brake equipment for vehicles, in combination, electric generator braking means, fluid pressure braking means, a retardation controller device for controlling the degree of application of the brakes, manually operable means for varying the setting of said retardation controller device for applying the brakes to effect a desired rate of retardation of the vehicle, a safety control pipe, means for venting said safety control pipe, and means subject to a reduction in safety control pipe pressure and for actuating said retardation controller to effect an application of the brakes independently of the position of said manually operable means, means controlled by said retardation device for initially applying said electric braking means to produce a degree of braking dependent upon the setting of the retardation controller, and means effective when the braking produced by said electrical means is insufficient to produce the rate of retardation called for by said retardation controller for applying the fluid pressure brakes.

9. In a brake equipment for vehicles, in combination, electric generator braking means, fluid pressure braking means, a retardation controller device for controlling the degree of application of the brakes, manually operable means for varying the setting of said retardation controller device for applying the brakes to effect a desired rate of retardation of the vehicle, a safety control pipe, means for venting said safety control pipe, and means subject to a reduction in safety control pipe pressure for actuating said retardation controller to effect an application of the brakes at a maximum rate independently of the position of said manually operable means, means for initially applying said electric generator braking means to produce a braking force sufficient to effect the rate of retardation of the vehicle called for by the retardation controller device and means effective when the maximum braking force produced by said electric braking means is insufficient to effect the desired rate of retardation for placing the control of the fluid pressure brakes under the retardation controller device and for releasing the electric brakes.

10. In a brake equipment for vehicles driven by electric motors, in combination, fluid pressure brakes, a source of power for said motors, a trolley for connecting said motors to said source of power, regenerative braking means comprising said motors and a controller for controlling the excitation thereof when said motors are connected for dynamic braking, and means comprising a low voltage relay operable upon trolley failure while the dynamic brakes are applied for effecting application of the fluid pressure brakes.

11. In a brake equipment for vehicles driven by electric motors, in combination, fluid pressure brakes, a source of power for said motors, a trolley for connecting said motors to said source of power, regenerative braking means comprising said motors and a controller for controlling the excitation thereof when said motors are connected for dynamic braking, a line switch between said trolley and said motors, a voltage balancing device subject to the differential voltages between said motors and said source of power and operable upon application of the brakes to effect operation of said line switch to connect said motors to said source of power when the generated motor voltage is equal to the voltage of the source, said voltage balancing device being operative upon trolley failure to effect operation of said controller to prevent excessive motor generated voltage, and means comprising a low voltage relay operable upon trolley failure while the dynamic brakes are applied for effecting application of the fluid pressure brakes.

12. In a brake equipment for vehicles, a regenerative braking means comprising the vehicle driving motors, a source of power, an exciter generator, a line switch for connecting said motors to said source of power, magnet valve means for controlling said exciter generator, a fluid pressure brake, magnet valve means for controlling said fluid pressure brake, a retardation controller and manually operable means for adjusting said retardation controller to control said first named magnet valve means to effect a desired degree of application of said regenerative braking means, means comprising a low voltage relay operable upon trolley failure for effecting control of said second named magnet valve device by said retardation controller to effect application of said fluid pressure brakes.

13. In a brake equipment for vehicles, a regenerative braking means comprising vehicle driving motors, a source of power, an exciter generator, a line switch for connecting said motors to said source of power, magnet valve means for controlling said exciter generators, a fluid pressure brake, magnet valve means for controlling said fluid pressure brake, a retardation controller and manually operable means for adjusting the setting of said retardation controller to control said first named magnet valve means to effect application of said regenerative braking means, and means comprising a voltage balancing device subject to the differential voltages of said trolley and of said motors for controlling the operation of said exciter generator upon trolley failure to prevent said motors from generating an excessive voltage.

14. In a brake equipment for vehicles, regenerative braking means comprising the vehicle driving motors, a source of power, an exciter generator, a line switch for connecting said motors to said source of power, magnet valve means for controlling said exciter generator, a fluid pressure brake, magnet valve means for controlling said fluid pressure brake, a retardation controller and manually operable means for adjusting the setting of said retardation controller to effect the control of said first named magnet valve means to effect application of said regenerative braking means, means comprising an over-voltage relay for tripping said line switch upon a predetermined over-voltage on said trolley, means comprising a low voltage relay operable upon trolley failure while the dynamic brakes are applied for effecting application of said fluid pressure brake, and means comprising a voltage balancing device subject to the differential in trolley voltage and voltage generated by said motors for controlling the operation of said exciter generator upon trolley failure to prevent said motors from generating an excessive voltage.

15. In a brake equipment for vehicles, in combination, a fluid pressure braking means, a regenerative braking means, a retardation controller device and manually operable means for applying the brakes, means controlled by said retardation controller device for controlling said braking means to effect an initial application of said regeneratve braking means and for repressing said fluid pressure braking means so long as the desired degree of braking is within the capacity of said regenerative braking means, a safety control pipe, and means responsive to a reduction in safety control pipe pressure for applying the brakes and for effecting the control thereof by said retardation controller device independently of said manually operable means.

16. In a brake equipment for vehicles driven by electric motors, in combination, a fluid pressure braking means, a braking means comprising said motors for applying a braking force to the vehicle wheels, a retardation controller and manually operable means for applying the brakes, means controlled by said retardation controller for controlling said brakes to effect the initial application of said regenerative braking means and for suppressing said fluid pressure braking means so long as the desired degree of braking is within the capacity of said regenerative braking means, a safety control pipe and means responsive to a reduction in safety control pipe pressure for interrupting the flow of power to said motors and for applying the brakes and for effecting the control of the degree of application thereof by said retardation controller independently of said manually operable means.

17. In a brake equipment for vehicles driven by electric motors, in combination, a fluid pressure braking means, electric generator braking means comprising said motors for applying a braking torque to the vehicle wheels, a retardation controller for effecting the application of said brakes and for controlling the degree of application thereof, the retardation controller being effective when actuated to a brake applying position to first effect application of said electric braking means, and when the braking force produced thereby becomes less than the desired degree of braking to effect the application of said fluid pressure braking means, manually operable means for actuating said retardation controller to a brake applying position, a safety control pipe and means responsive to a reduction in safety control pipe pressure for interrupting the supply of power to said motors and for actuating said retardation controller to a braking position to effect a predetermined degree of retardation of the vehicle.

18. In a brake equipment for vehicles driven by electric motors, in combination, means for supplying power to said electric motors comprising a source of power, a line switch, a motor controller, fluid pressure braking means, electric generator braking means comprising said motors for applying a braking torque to the vehicle wheels, a brake controller, a retardation controller for effecting the application of said brakes and for controlling the operation of said brake controller to effect a desired degree of application thereof, said retardation controller being effective when actuated to a brake applying position to first effect application of said electric braking means, and when the braking force produced thereby becomes less than the desired degree of braking to effect the application of said fluid pressure braking means, manually operable means for controlling said line switch and said motor controller to effect the propulsion of said vehicle and for also actuating said retardation controller to a brake applying position to effect a desired rate of retardation of the vehicle, a safety control pipe, and means responsive to a reduction in safety control pipe pressure for interrupting the supply of power to said motors and for actuating said retardation controller to a brake applying position to effect a predetermined maximum degree of retardation of the vehicle.

19. In a brake equipment for vehicles, in combination, electric generator braking means for applying a braking torque to the vehicle wheels, fluid pressure braking means, a manually operable brake controlling device for applying the brakes in accordance with the amount of movement from its release position, automatic means governed by said brake controlling device for initially effecting the application of said electric braking means and for suppressing the application of said fluid pressure braking means so long as the amount of braking called for by said brake controlling device is within the capacity of said electric braking means, said automatic means being effective to progressively increase the degree of electric braking until the desired degree of braking is effected and effective just prior to the maximum degree of electric braking to effect application of said fluid pressure braking means and subsequently to effect interruption of said electric braking means.

20. In a brake equipment for vehicles, in combination, electric braking means for applying a braking torque to the vehicle wheels, a fluid pressure braking means for applying a braking force to the vehicle wheels, a retardation controller, and means for adjusting the setting of the retardation controller for applying the brakes and for effecting a desired rate of retardation of the vehicle, said means being effective to initially apply said electric braking means and suppress the application of said fluid pressure means, automatic means controlled by said retardation controller upon the application of the brakes for controlling the degree of application of said electric braking means so long as the required amount of braking is within the capacity of said braking means, and effective upon the application of said electric braking means substantially to its full capacity to initiate the application of said fluid pressure braking means and subsequently to release said electric braking means.

21. In a brake equipment for vehicles, in combination, a fluid pressure brake system, vehicle driving motors adapted to be connected to operate as an electrical braking means, means operative when said motors are connected to operate as said electrical braking means for suppressing the operation of said fluid pressure brake system, and retardation controlling means comprising a manually operable member which upon initial movement effects the operation of said motors as said electrical braking means, and at the same time conditions the retardation controlling means to control the degree of braking effect produced so as to establish a rate of retardation corresponding to the degree or extent of movement of said manually operable member.

22. In a vehicle brake system, in combination, a brake cylinder, vehicle drive motors adapted to be connected to operate as electric brakes, an adjustable type retardation controller device, a manually operable element for adjusting said retardation controller device when initiating an application of the brakes, means operatively responsive to the initial adjustment of said retardation controller device for causing said motors to be connected to operate as electric brakes, and means operative so long as said motors produce effective electric braking for suppressing supply of fluid under pressure to said brake cylinder.

JOHN W. LOGAN, Jr.